(12) United States Patent
Barrett (10) Patent No.: US 11,999,448 B2
(45) Date of Patent: Jun. 4, 2024

(54) WATER-BUOYANT STRUCTURE

(71) Applicant: Waterborne Development Company Pty Limited, Sydney (AU)

(72) Inventor: Frederic Charles Barrett, Sydney (AU)

(73) Assignee: Waterborne Development Company Pty Limited, Sydney (AU)

( * ) Notice: Subject to any disclaimer, the term of this patent is extended or adjusted under 35 U.S.C. 154(b) by 379 days.

(21) Appl. No.: 17/266,834

(22) PCT Filed: Aug. 7, 2019

(86) PCT No.: PCT/AU2019/050823
§ 371 (c)(1),
(2) Date: Feb. 8, 2021

(87) PCT Pub. No.: WO2020/028945
PCT Pub. Date: Feb. 13, 2020

(65) Prior Publication Data
US 2021/0347448 A1  Nov. 11, 2021

(30) Foreign Application Priority Data
Aug. 8, 2018 (AU) .................... 2018902884

(51) Int. Cl.
| | | |
|---|---|---|
| B63B 35/44 | (2006.01) | |
| B63B 5/14 | (2006.01) | |
| B63B 21/48 | (2006.01) | |
| E02D 27/06 | (2006.01) | |
| E04B 1/16 | (2006.01) | |
| E04B 1/18 | (2006.01) | |

(52) U.S. Cl.
CPC ............ *B63B 35/44* (2013.01); *B63B 5/14* (2013.01); *B63B 21/48* (2013.01); *E02D 27/06* (2013.01);
(Continued)

(58) Field of Classification Search
CPC .......... B63B 35/44; B63B 5/14; B63B 21/48; B63B 2035/4426; E02D 27/06;
(Continued)

(56) References Cited

U.S. PATENT DOCUMENTS 1,313,592 A * 8/1919 Giletti ...................... B63B 5/16
114/83
1,316,659 A   9/1919 Williams
(Continued)

FOREIGN PATENT DOCUMENTS

WO   WO 2007/053377   5/2007

OTHER PUBLICATIONS

International Search Report and Written Opinion issued in International Application PCT/AU2019/050823 on Sep. 23, 2019.
(Continued)

*Primary Examiner* — Anthony D Wiest
(74) *Attorney, Agent, or Firm* — Fish & Richardson P.C.

(57) ABSTRACT

A water-buoyant structure formed from concrete is disclosed. The structure comprises an outer wall that surrounds a perimeter of the structure and an inner wall separated from the outer wall by a cavity, such that the cavity extends for the perimeter of the structure. Separating the cavity can provide sufficient buoyancy to the structure to allow 5 the structure to float. The combination of outer and inner walls may also provide increased resistance to catastrophic damage in the event of an impact (e.g. the inner wall may remain intact).

11 Claims, 3 Drawing Sheets

(52) U.S. Cl.
CPC .................. *E04B 1/16* (2013.01); *E04B 1/18* (2013.01); *B63B 2035/4426* (2013.01); *E02D 2300/002* (2013.01)

(58) Field of Classification Search
CPC ....... E02D 2300/002; E04B 1/16; E04B 1/18; E04B 2001/3577; Y02A 30/00; F05B 2240/93
See application file for complete search history.

(56) References Cited

U.S. PATENT DOCUMENTS

| | | | | |
|---|---|---|---|---|
| 2,454,403 | A | * | 11/1948 | Palmieri .................. B63B 3/20 114/65 A |
| 4,548,153 | A | * | 10/1985 | Watchorn ................ B63B 35/44 405/218 |
| 5,885,028 | A | | 3/1999 | Blanchard et al. |
| 7,373,892 | B2 | * | 5/2008 | Veazey .................. E02D 27/06 114/77 R |
| 2001/0036387 | A1 | | 11/2001 | Richter et al. |
| 2002/0152942 | A1 | | 10/2002 | Steller et al. |
| 2007/0095266 | A1 | | 5/2007 | Balczewski |
| 2011/0286804 | A1 | * | 11/2011 | Lovie ..................... E02D 29/10 405/210 |

OTHER PUBLICATIONS

GCC Patent Office Examination Report issued in GCC Application GC-2019-38068 on Sep. 20, 2020.

\* cited by examiner

WATER-BUOYANT STRUCTURE

CROSS-REFERENCE TO RELATED APPLICATIONS

The present application is a National Phase application under 35 U.S.C. § 371 of International Application No. PCT/AU2019/050823, filed Aug. 7, 2019, which claims priority from Australian Application No. 2018902884, filed Aug. 8, 2018. The entire contents of the prior applications are hereby incorporated by reference.

TECHNICAL FIELD

This disclosure relates to a water-buoyant structure formed from concrete, which in some embodiments may take the form of a building.

BACKGROUND ART

Doubled-walled floating vessels are known for shipping applications, where tankers and other transport vessels may comprise a partial 'double-hull' design, for example as disclosed in WO2007053377. In WO2007053377 the double-hull design is only employed intermediate the bow and stern of the vessel, with the bow and stern to a significant extent of the vessel not employing a double-hull design at all.

The above references to the background art do not constitute an admission that the art forms part of the common general knowledge of a person of ordinary skill in the art. The above references are also not intended to limit the application of the water-buoyant structure as disclosed herein.

SUMMARY OF THE DISCLOSURE

Disclosed herein is a water-buoyant structure formed from concrete. The water-buoyant structure may be constructed off-site, for example, in a dry dock and subsequently floated to a desired location. Thus, conventional building construction methodologies may be employed to construct the structure. Herein, the term "concrete" is to be understood to include a range of cementitious materials, including Portland cement, magnesium and calcium cements, other known alternative cements (e.g. pozzolans, geopolymers), etc.

The structure comprises an outer wall that surrounds a perimeter of the structure and an inner wall separated from the outer wall by a cavity, such that the cavity extends for the perimeter of the structure. Separating the cavity can provide sufficient buoyancy to the structure to allow the structure to float. The combination of outer and inner walls may also provide increased resistance to catastrophic damage in the event of an impact (e.g. the inner wall may remain intact).

Typically, the water-buoyant structure as disclosed herein may be deployed in applications where long or repeat sea journeys are not required. In such applications, the need for an efficient, fluid-dynamic sea-going perimeter shape is of reduced importance as compared to traditional vessels. While the structure may be constructed off-site and subsequently floated to a desired location, where extended sea journeys are required to position the structure, the structure may be transported by means of other vessels, for example, submersible heavy lift ships and the like.

Thus, for the water-buoyant structure as disclosed herein there is not the same constraint on the design of the structure when used as a waterborne vessel (i.e. as for traditional vessels), such that the cavity can be extended for the perimeter of the structure (e.g. it may be employed for a large portion of the structure). The structure will also be required to conform to the regulatory requirements of each particular region of the world to which the structure is deployed and operated (e.g. naval and structural codes, maritime laws, passenger carrying requirements, etc.)

Also, as set forth above, because the structure is typically not deployed in applications involving long or repeat sea journeys, construction techniques that are more akin to the building construction industry can be employed, as opposed to costlier or specialist ship-building techniques.

In an embodiment, the structure may comprise a base, where the outer and inner walls may each extend to define the base, such that the cavity may also extend for the base of the structure. By extending the cavity around the perimeter walls and the base of the structure, the cavity may correspond to all areas of the outer wall that contact the water in use. This may be particularly advantageous in the event of damage to and e.g. water ingress through such submerged parts of the outer wall, where the cavity and inner wall can help to limit further water ingress into the structure.

In an embodiment, a plurality of transverse webs may be provided that extend between the inner wall and outer wall. The webs may be configured to divide the cavity into a plurality of sub-cavities.

In some embodiments, one or more of the plurality of sub-cavities may be configured to be made at least watertight, and optionally fluid-tight. The plurality of webs and water/fluid-tight sub-cavities may be advantageous in the event of damage to the outer wall of the structure, where fluid (e.g. water) ingress into the structure may be limited to only those sub-cavities that have a fluid connection to an area corresponding to the damaged portion of the outer wall (i.e. the webs defining the water/fluid-tight sub-cavity may prevent fluid (e.g. water) from passing between adjacent sub-cavities and so limit the flow of fluid (e.g. water) between the outer and inner walls). In this way, water ingress may be limited to just a portion of the total cavity space between the inner and outer walls, so as to preserve the buoyancy of the structure in the event of collision.

In one variation, the one or more of the sub-cavities may be able to be flooded with water (or other fluid) and, optionally, emptied of that water, for example by pumping. This may enable the buoyancy of the structure to be controlled and altered. For example, the structure may be transported, with a certain amount of water in one or more of the sub-cavities, to a location. A superstructure may then be arranged (e.g. constructed) on the structure once in location. Additionally, or alternatively, there may be loading from users, equipment, etc. on the structure when at the location. With such loads, amounts of water in the one or more sub-cavities may be released (e.g. pumped-out) to cause the structure to rise in the body of water in a compensatory manner to the weight of superstructure, etc. Further, in the event of damage to the outer wall or to compensate for differing/differential loads placed on the structure, various sub-cavities can be intermittently or continually emptied of water (e.g. by a pump). Thus, the structure can provide a 'variable prismatic void' below the waterline of the structure, with buoyancy and weight being controlled to define a floating body of variable fluid displacement. Such adjustable ballasting may allow the centre of buoyancy of the structure to be controlled, thereby affecting the trim and/or heel (roll) of the structure.

The separation into sub-cavities of the variable ballast may also reduce the 'free surface effect' of the ballast, wherein roll of the floating structure may cause a shift in the centre of gravity of the structure due to movement of the ballast. The significance of this effect is proportional to the cube of the width of the compartment or sub-cavity. By separating one large cavity into three smaller sub-cavities for example (i.e. with two baffles), the displacement of the centre of gravity of the ballast in response to roll of the structure may be reduced by a factor of 9.

It should be noted that the superstructure need not be arranged (e.g. constructed) after the water-buoyant structure has been positioned in its intended location. For example, the superstructure may be constructed together with the base structure as an integral unit, i.e. off-site and at the same time as the water-buoyant structure, for example, in a dry dock. The completed unit comprising the water-buoyant structure and superstructure can be subsequently floated to a desired location. The superstructure may also be arranged on the water-buoyant structure or augmented/modified at any number of intermediate locations between the construction site for the water-buoyant structure and the intended location of the completed structure.

In some embodiments, the one or more of the sub-cavities may be able to be flooded with water and, optionally, emptied of that water (e.g. by pumping) such that the structure can be nearly or fully submerged and, optionally, resurfaced (e.g. once in location). For some applications, the structure may be permanently submerged and remain so in use.

In another variation, one or more of the webs may comprise a baffle, such that each sub-cavity may be separated from each adjacent sub-cavity by a common baffle.

In some variations, at least some of the baffles may be configured to allow fluid (e.g. water) to pass between adjacent sub-cavities.

In some variations, the configuration of the at least some of the baffles may comprise one or more valves arranged at a given baffle. The valves may control the passage of fluid (e.g. water) between the adjacent sub-cavities, allowing the buoyancy of the structure to be adjusted, for example during loading and unloading of the structure, so as to control the trim of the structure and the draft of the structure. This may allow the waterline level to be controlled during weight transfer operations.

Herein, the "trim" of the structure is defined as the difference between the depth of the waterline on the outer wall at one end of the structure, to that at an opposing end of the structure, along a long axis of the structure (i.e. the difference in draft between opposite ends of the structure). Herein, the "draft" (or "displacement draft") is defined as the vertical distance between the base of the structure and the waterline (i.e. the vertical length of outer wall below the waterline).

Each of the inner and outer walls may be formed from concrete, which may optionally be reinforced. In some embodiments, the reinforcing of the concrete inner and outer walls may comprise reinforcing rod, bar or mesh, which may optionally be pre- or post-tensioned. When constructed at a dry dock, at least some known building construction techniques may be employed when forming up the formwork and reinforcing for the receipt of concrete therein.

In some embodiments, the water-buoyant structure may further comprise a basement structure, at least a portion of which may locate below the waterline in use. The basement structure may be used as a storage area, for example, for the stowage of vehicles, other cargo or equipment, or may contain services for a superstructure of the structure. The basement structure may also act as an area for containing ballast, depending on the buoyancy requirements of the structure.

In some embodiments, the water-buoyant structure may further comprise a superstructure that sits above the basement structure, to locate above the waterline in use. The superstructure may also act as a shelter, holding or storage area, or may comprise dwellings for people, for example, allowing the structure to act as a pontoon, wharf, etc. The superstructure may further comprise connections to the shoreline to allow the transport of goods and people from the shoreline to the structure and vice versa.

In some embodiments, the volume of the cavity or sub-cavities of the water-buoyant structure may equate to less than half of the remaining volume of the structure. Such a cavity volume may contribute to ensuring upright flotation of the structure.

In some embodiments, in use, the freeboard of the water-buoyant structure may be substantially less than the draft of the structure. This may result in improved stability of the floating structure, particularly in response to changing environmental conditions, or water disturbances (e.g. wakes, waves, etc.) caused by passing vessels, wind, storms, etc.

Herein, the "freeboard" Fr (or "residual freeboard") is defined as the height of the outer wall of the structure above the waterline.

In some embodiments, the water-buoyant structure may further comprise an anchoring system. The anchoring system may be configured to anchor the structure to the ocean floor in use.

In some variations, the anchoring system may comprise elastic supporting elements and restraint systems. Such supporting elements and restraint systems may be responsive to tidal variation, allowing for limited translational movement of the structure, whilst restricting pitch, yaw, roll and vibrational movement of the structure. The restraining effects of the anchoring system, combined with the significant inertia of the structure, may provide a significant damping effect to movements induced by the body of water or other environmental forces, thereby also improving the stability of the structure in use.

BRIEF DESCRIPTION OF THE DRAWINGS

Embodiments will now be described by way of example only, with reference to the accompanying drawings in which.

DETAILED DESCRIPTION

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

Figure 1:
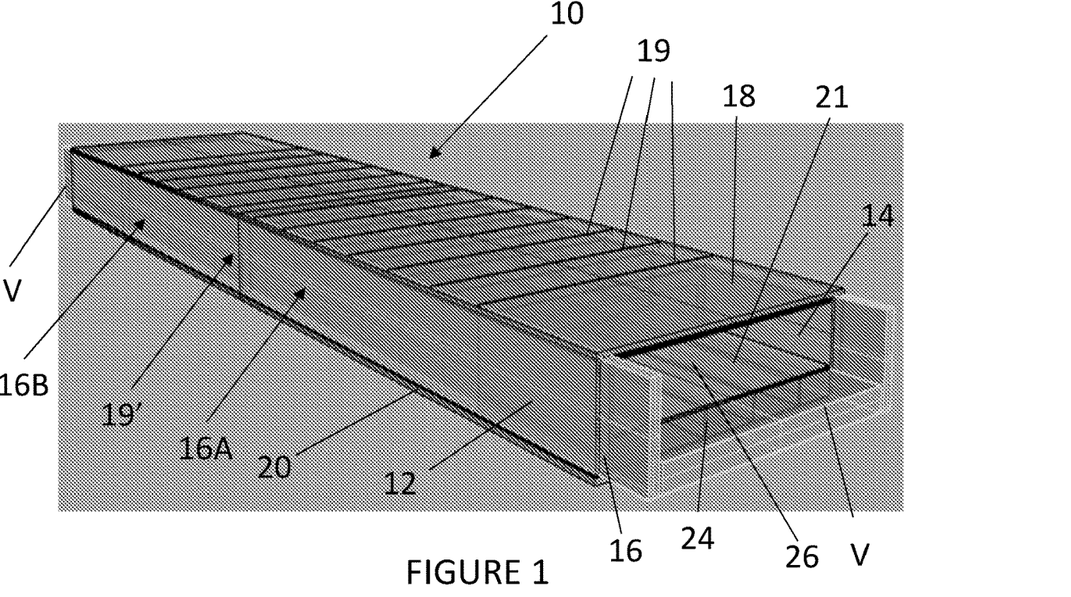
FIG. 1 is a schematic perspective sectional view of a structure in the form of a floating building in accordance with a first embodiment.

Referring to FIG. 1, a schematic perspective sectional view of a structure is shown which can take the form of a water-buoyant building 10. The building 10 comprises an outer wall 12 that surrounds a perimeter of the building and an inner wall 14 separated from the outer wall 12 by a cavity 16, such that the cavity also extends for the perimeter of the building (i.e. around the sides and ends of the building).

In FIG. 1, the opposite ends 17 of the building are removed to illustrate the void space V in the building perimeter. In FIG. 1, the void space V is illustrated as a light-shaded projection extending from the opposite sectioned ends of the building. The opposite ends 17 of the building are, however, shown in place in FIGS. 5 & 6.

In FIG. 1, it will also be seen that the cavity 16 extends over and in relation to a base 20 of the building, with the cavity at the base being enclosed by a "false" inner base 21 that is spaced above the base 20, and that extends between the inner walls 14, etc. Thus, the cavity 16 and void space V correspond to all areas of the outer wall and base that contact the water in use.

Figure 2:
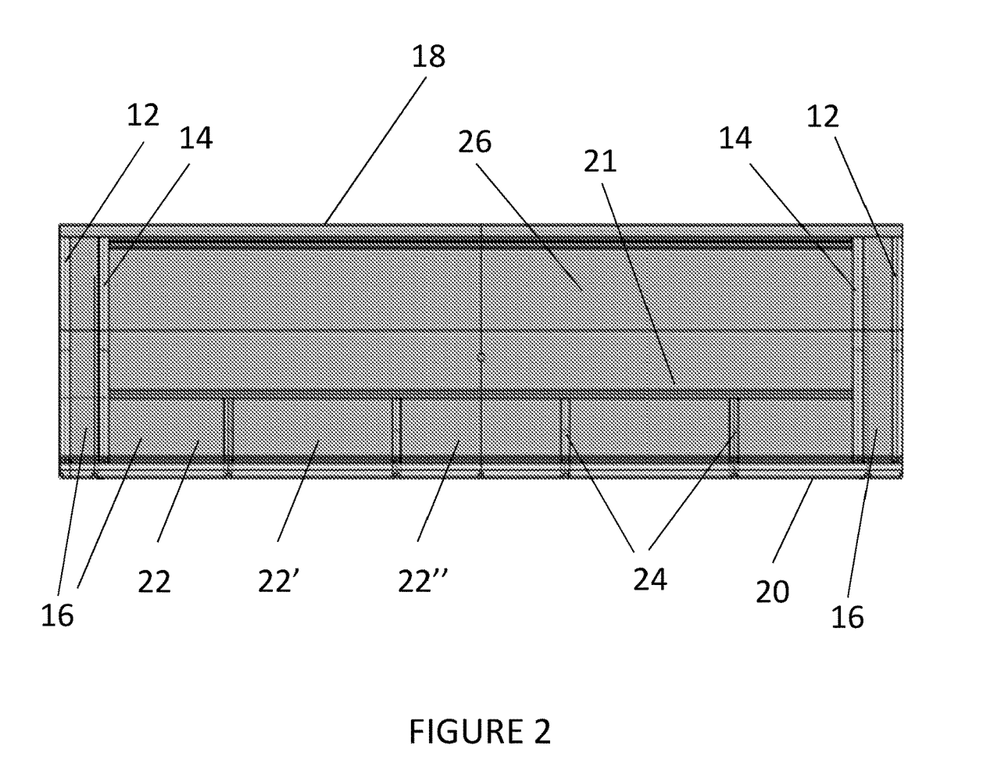
FIG. 2 is a front sectional view of the floating building according to FIG. 1.
Figure 3:
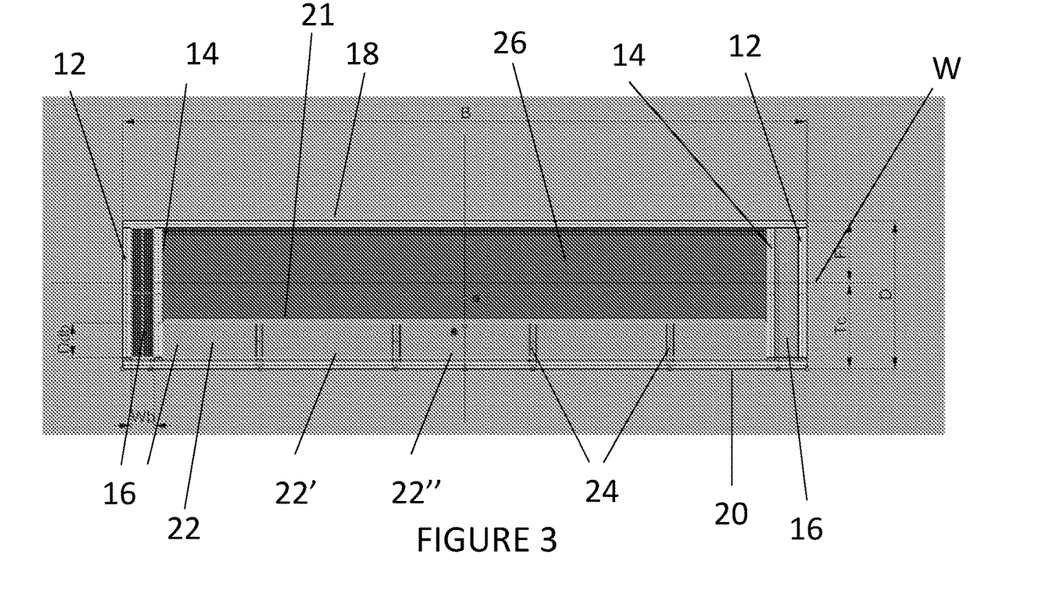
FIG. 3 is another front sectional view of the floating building according to FIG. 1 but shaded to illustrate void space volume.

FIGS. 1-3 illustrate a basement 26 located below a deck 18 of the building 10. The basement 26 is defined by the area extending between the deck 18 and the inner walls 14, as well as inner walls located adjacent to the end walls 17, and the false base 21. The basement 26 is typically almost fully enclosed save for a doorway from the deck 18. Such a doorway may also be made fluid-tight. Further, the basement 26 is typically surrounded by the cavity 16. The basement 26 may be configured to hold cargo of various types or passengers. In use, a portion of the basement 26 locates below the waterline, with the height of this portion varied as the buoyancy and loading of the building is adjusted, as set out above.

In FIG. 1, it will also be seen that the basement 26 comprises a number of separated, transversely extending bulkheads 19 (i.e. extending between the side walls of the building 10). These bulkheads 19 may be solid across the width of the basement 26, or they may have one or more apertures, doors or passages therethrough to enable movement of goods, people, etc. between the resulting compartments defined between each of adjacent bulkheads 19. As explained below, some such bulkheads may extend from one side of the building to the other (i.e. into the cavities and between the outer side walls 12 of the building 10)

It should be understood that, while the illustrated embodiments depict a building of rectangular form, the floating building can be constructed to have a variety of perimeter shapes, including square, circular, etc. A range of polygonal perimeter shapes may be employed, including combinations of shapes. In each case, the cavity can extend for the perimeter of the building.

Each of the outer 12 and inner 14 walls is formed from reinforced, water-tight concrete. The reinforcing can take the form of steel rod, bar, or mesh and various combinations thereof. Other reinforcing means may be incorporated into the concrete, such as fibrous additives. Where the reinforcement includes rod or bar, the rod or bar can be pre- (i.e. prior to pouring of the concrete) or post-tensioned to achieve a desired tension/compression effect. Corrosion resistance measures can be applied to the reinforced concrete, in order to extend the serviceable life of the building. For example, coatings can be applied to the cured concrete and reinforcing, and/or additives can be added into the concrete mix. Concrete (and like cementitious materials) offer the advantage of providing considerable inertia and stability when the building is located in a body of water, enabling the building 10 to be deployed as a wharf, pontoon, floating accommodation, entertainment facility, warehouse, etc.

FIG. 2 illustrates a front schematic cross-section of the water-buoyant building 10. The outer wall 12 and inner wall 14 extend up from the base 20 and support a deck 18 of the building in a spaced relationship over the base 20. Because the outer walls 12, end walls 17 and inner 14 walls extend between the base 20 and deck 18, for the entire perimeter of the building, the ends and sides of the building are protected or mitigated against the risk of catastrophic failure (e.g. sinking) of the building in the event of damage to the outer, end or base walls. Likewise, because the cavity extends between the base 20 and false base 21, the base of the building is also protected or mitigated against the risk of catastrophic failure. Such damage may occur, for example, in the event of collision of the building with the shore, rocks, other vessels, pylons, piers or other structures. Thus, the cavity 16 and void space V extend around the inner and end walls 14, 17, etc. and base 20 of the building 10, thereby enveloping portions of the inner walls of the building that locate below the waterline in use.

The building is constructed such that each of the inner 14, end 17 and outer 12 walls are watertight, preventing water from passing into the cavity 16/void space V, or from the cavity 16 and through the inner wall 14 and into the interior (basement 26) of the building 10, such as may occur in the event of damage to the outer wall 12. Such a design mitigates the risk of catastrophic failure (i.e. sinking) of the building.

In relation to the base 20 and inner base 21, the cavity 16 is divided into sub-cavities 22 by partitions in the form of longitudinal webs 24. Each web 24 extends along the base 20 of the structure, such that the webs 24 can be seen as defining a form of longitudinal (as opposed to transverse) bulkhead. The webs 24 extend between and connect the base 20 and inner base 21 to define each sub-cavity 22 as an elongate compartment. Each web 24 also serves to strengthen the building 10, improving the rigidity of the base and of the overall structure.

Each compartment 22 is typically fabricated to be made fluid-tight with respect to adjacent compartments (22', 22", etc.). In this regard, water entering a given compartment 22, for example, through a damaged portion of the base 20, is prevented from passing from the given compartment 22 to an adjacent compartment 22', etc. This allows the building 10 to maintain buoyancy in the event of damage to a portion of the base 20, with water ingress into cavity 16 limited only to the compartments 22 in fluid communication with the damaged portion of the base 20.

Each compartment 22 may also be divided into a number of sub-compartments along its length by transversely extending bulkheads/webs/baffles, which may also serve to strengthen the building 10, improving the overall rigidity of the hull.

The compartments may also be provided with valves in their common wall to allow for a controlled fluid communication between adjacent compartments 22', 22", etc. For example, the valves can be mounted to enable fluid flow between the compartments, allowing water (or other fluids) to be moved between compartments 22, such as by pumps. Sensors (including floats, etc.) can be fitted within the compartments 22 to sense the water level in given compartments. Such information can be passed to a buoyancy control system, for monitoring and control of the buoyancy of the building.

Referring again to FIG. 1, it will be seen that the side cavities defined between the outer 12 and inner walls 14 are also divided by an intermediate bulkhead 19' that extends transversely between opposite outer side walls 12 of the building 10. Thus, the side cavities as shown are divided into two separated compartments 16A and 16B. Again, each compartment 16A, 16B is typically fabricated to be made fluid-tight with respect to its adjacent compartment 16B, 16A, such that water entering a given compartment, for example, through a damaged portion of the outer wall 12, is prevented from passing to an adjacent compartment.

It should be understood that more than one bulkhead can be configured to extend into the side wall cavities to provide a number of separated side cavities or compartments 16A, 16B, 16C, etc. Also, one or more of the longitudinal webs 24 can extend into, so as to divide, the end wall cavities into a number of separated end cavities or compartments. Further webs and bulkheads/baffles can extend throughout the structure to form additional water and/or fluid tight passages or compartments. Such passages may be employed for evacuating passengers in the event of fire, fluid ingress or other emergency situations. Such passages may also be configured to carry services throughout the structure, such as power, water, gas, etc. These passages can be constructed so as to comply with regulatory requirements of jurisdictions in which the structures are built and operated.

The outer walls 12 may also be provided with one or more valves, to enable fluid connection between the surrounding body of water and the side wall cavities 16A, 16B. Additional valves can also be provided to allow fluid to be passed between the side wall cavities 16A, 16B and the longitudinal compartments 22 in the base. In this way, water may be pumped into and out of the building 10 in the form of ballast, and thus the weight carried by the building (and hence buoyancy) controlled. The cavities 16A, 16B and compartments 22 therefore can act as integral ballast tanks.

Figure 4:
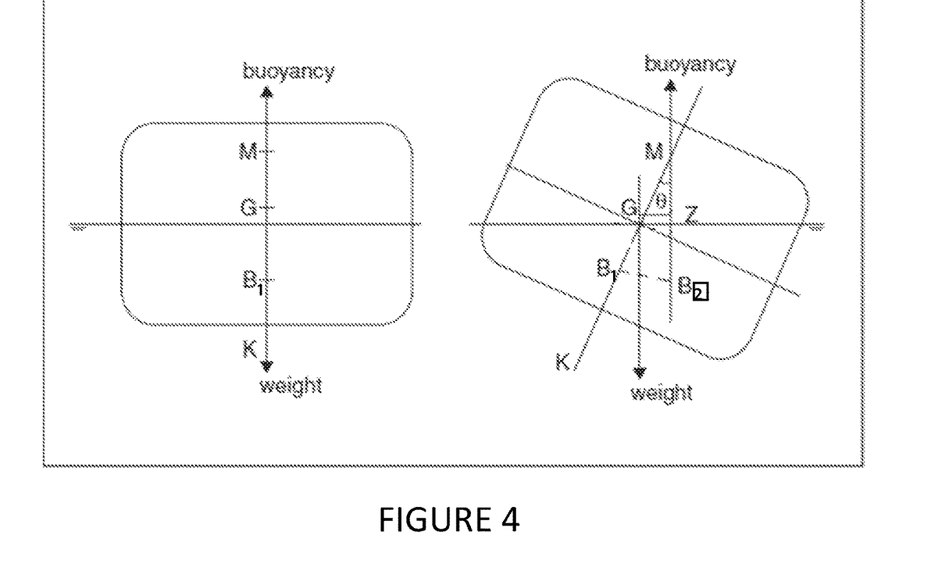
FIG. 4 is a schematic view illustrating the effects of weight and buoyancy distribution in the floating building according to FIGS. 1, 2 & 3.

By controlling the relative amounts of water ballast present in different compartments across the perimeter of the building 10, the relative buoyancy of different parts of the building 10 may be adjusted in order to affect the trim and roll or heel/list of the building 10 in the water, as shown in FIG. 4.

FIG. 4 refers to the stability of the floating building, illustrating the effects of the downward weight and upward buoyancy forces in both the 'upright' (equilibrium) and 'rolled' or 'heeled over' conditions for the building, with K denoting the keel of the building. The centre of gravity G, centre of buoyancy $B_1$ and the metacentre M of the building are illustrated. The centre of buoyancy $B_1$ refers to the centre of mass of the volume of water displaced by the building. When the floating building rolls through a roll angle $\theta$ from its upright or neutral position, $B_1$ is shifted to $B_2$ (i.e. the centre of buoyancy may move both laterally and vertically, relative to the waterline). The point at which a vertical line Z drawn from the 'rolled' centre of buoyancy $B_2$ intersects with a vertical line drawn from the original 'upright' centre of buoyancy $B_1$ (shown as being rotated in the 'rolled' condition) is defined as the metacentre M of the building. The metacentre remains directly above the centre of buoyancy of the building (i.e. $B_1$ or $B_2$ as illustrated in FIG. 4) and can be considered fixed relative to the building for small roll angles $\theta$ (~0-15°). The metacentre M is a function of the inertia of the building (its inertial resistance to rolling) and its volume. The inertial resistance of the building is in turn a function of the waterline width of the floating building (i.e. the width of the building perimeter at the waterline), which acts to resist roll of the structure. As described in more detail below, and in reference to FIG. 3, the ratio of the width of the perimeter of the building B, or the beam, (i.e. the distance between opposing outer walls 12) relative to the height of the building D (the distance between the base 20 and the deck 18) is chosen such that a required transverse building stability, or inertial resistance to rolling is achieved. The significantly higher weight of the floating building in comparison to the superstructure, coupled with the relatively wide and shallow 'hull' design of the floating building (in contrast to conventional floating vessels) relative to the buoyancy of the building, contributes to the buildings exceptional resistance to excessive roll or overturning. The design of the structure also acts to limit deck-level accelerations resulting from any roll that does occur.

When the load or ballast of the floating building remains stable, the centre of gravity G may be considered to be fixed (as illustrated in FIG. 4). For small angles of $\theta$ (roll), the metacentre M may also be considered fixed. The centre of buoyancy $B_1$ however, moves as the building rolls e.g. from $B_1$ to $B_2$ as the building rolls through an angle of $\theta$ from the upright condition.

The distance between the metacentre M and the centre of gravity G of the building is termed the metacentric height GM. The metacentric height is a measure of the static stability of the floating building 10, with a larger metacentric height indicating a greater stability of the building against rolling (i.e. a shorter period of roll and increased resistance to overturning). A low or negative GM increases the risk of a floating structure capsizing. Positive, but very low metacentric heights (GM less than 0.5 meters for example) may result in a floating structure that is stable in calm conditions, but provide a lower margin of safety against capsizing in the event of rough seas, damage and fluid ingress to the floating structure. A high metacentric height is therefore preferred from the standpoint of stability of the floating structure. Excessively large values of GM are to be avoided however, as very large metacentric heights can result in very short periods of roll (e.g. in response to waves or wakes), which may lead to high accelerations at the deck level or superstructure of the building and be uncomfortable for passengers, particularly during rough seas. A balanced or 'ideal' metacentric height is thus preferred, which balances both the roll stability and roll acceleration of the floating building 10.

For the floating building 10, the relationship between G and $B_1$ is maintained such that GM is positive at all times, in any event of collision, fluid ingress or otherwise. For example, the value of GM for the floating building may exceed 0.5 meters at all times (i.e. including in any event of collision, fluid ingress or otherwise), in order to meet regulatory requirements governing the various regions of operation of the building. Such a value of GM is determined by the particular building perimeter design and weight, as outlined above. As such, combinations of differing building geometry (perimeter design/shapes) and building weights may be used to achieve suitable GM values i.e. exceeding 0.5 meters, whilst maintaining an advantageous balance between sufficient resistance to roll and acceptable deck accelerations. While metacentric height M is a valid indication of stability for small angles of roll (e.g. ~0-15°), at larger angles the righting arm GZ (the horizontal distance between the vertical lines of buoyancy $B_1$ and gravity G) must be determined to ensure acceptable stability of the building against capsizing.

Trim and roll adjustments can be made in response to varying loads placed on the building 10, for example during loading and unloading of cargo and other materials onto the deck 18 of the building 10. Further, by varying the total amount of water present in the cavities 16A, 16B and compartments 22, the depth of the waterline relative to the outer wall 12 and thus the deck 18 (i.e. the freeboard and draft of the building 10) may be controlled, by varying the total weight acting on the building. This may be of particular use when floating the building 10 in shallow bodies for water (where a low draft is required), or to adjust the freeboard during loading/unloading operations or to account for changing weather conditions and safety considerations.

The freeboard Fr (or residual freeboard) is defined as the distance between the deck 18 of the building and the waterline W, as illustrated in FIG. 3 (i.e. the length of outer wall 12 above the waterline). The draft Tc (or displacement draft) is defined as the distance between the base 20 of the building and the waterline W (i.e. the length of outer wall 12 below the waterline). The building 10 is dimensioned, and the amount of water retained in the building controlled, such that the residual freeboard Fr is less than the displacement draft Tc, so as to impart stability to the floating building. Further, the ratio of the width of the perimeter of the building B, or the beam, (i.e. the distance between opposing outer walls 12) relative to the height of the building D (the distance between the base 20 and the deck 18) is chosen such that a required transverse building stability is achieved.

The distance between adjacent outer 12 and inner 14 walls is selected to provide a desirable ratio between the width Wb of the cavity 16 between the walls and the width, or beam B, of the building/structure. Such desirable values of Wb:B may, for example, be 1:20. However, it should be understood that the ratio of Wb:B can vary, depending on the final geometry of the building/structure.

The height Ddb of the cavity 16 adjacent the base 20 of the building, or the height of the compartments 22 (i.e. the distance between the floor 21 of the basement 26 and the building base 20), is selected to provide a desirable ratio between the cavity height Ddb and the total height D of the building/structure. Such desirable values of Ddb:D may be for example 1:5. However, again it should be understood that the ratio of Ddb:D can vary, depending on the final geometry of the building/structure.

The total volume of the cavity 16 between the inner 14 and outer 12 walls (whether or not divided into sub-cavities 16A, 16B, 22) is chosen such that it comprises no greater than ~50% of the total volume of the basement 26 of the building. Further, in order to maintain upright floatation of the building, this total cavity volume is chosen such that it comprises no less than ~50% of the total free volume of the basement 26 of the building 10, when the basement 26 is occupied by cargo.

By flooding all of the sub-cavities 16A, 16B, 22, the entire building may be fully submerged in the water. Expelling the water from the sub-cavities 16A, 16B, 22, e.g. by pumping through above the waterline valves (e.g. in the outer wall 12), allows the building to be resurfaced. For this purpose, one-way vents can be provided to allow air or other fluids to occupy the space left by the expelled water. For example, such one-way vents may communicate with air in the basement 26 of the building 10.

Figure 5:
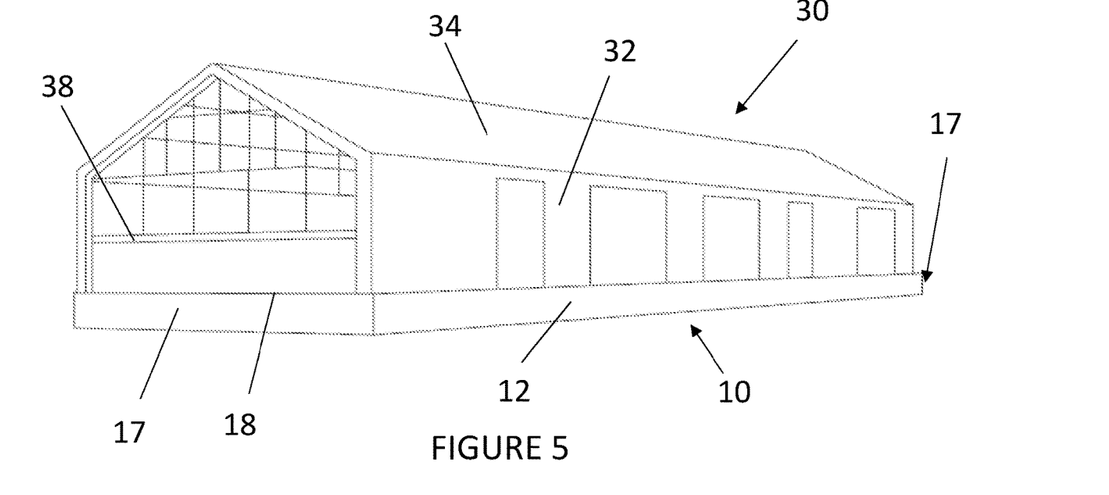
FIG. 5 is a perspective view of a partially constructed superstructure on a floating building, according to an embodiment.
Figure 6:
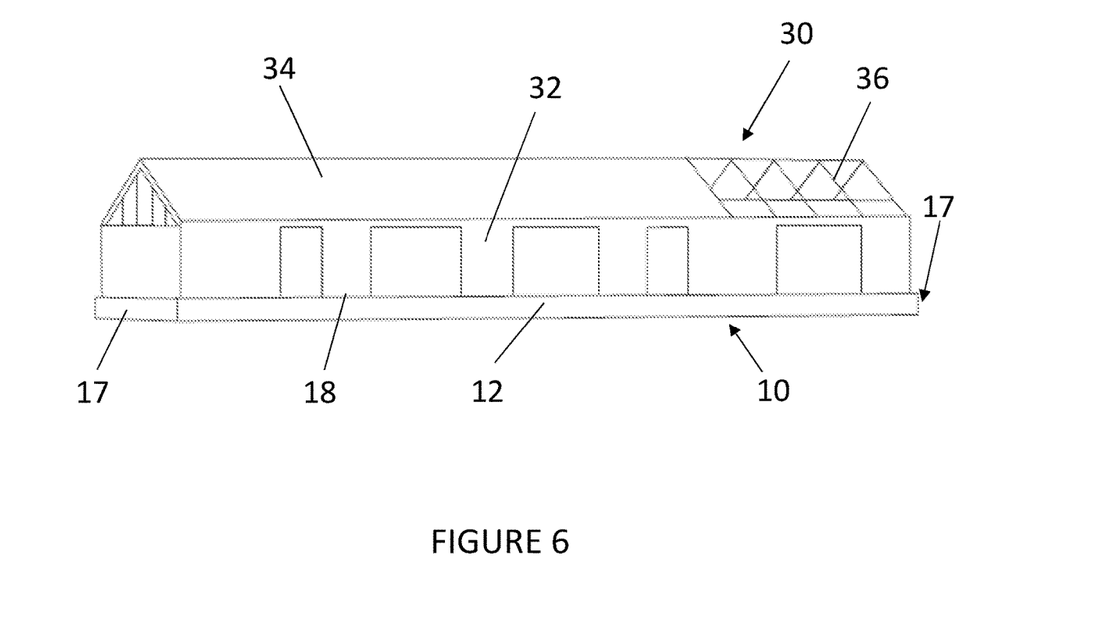
FIG. 6 is another perspective view of the partially constructed superstructure on a floating building, according to an embodiment.

FIGS. 5 and 6 illustrate a partially constructed superstructure 30, erected on the deck 18 of the floating building 10, to locate above the basement 26. In the embodiment illustrated in FIGS. 5 and 6, the superstructure comprises walls 32 extending upwardly from the deck 18, adjacent the outer walls 12 of the building. The superstructure walls are capped with a roof 34. The superstructure comprises internal framework 36 and can comprise multiple superstructure floors 38.

The floating building allows the superstructure 30 to be erected on-site, i.e. after the building 10 has been floated and moved into location. Thus, the building can function as a floating foundation for the superstructure 30. This may allow, for example, the base structure 10 to constructed in one location (e.g. in a dry dock), be floated into a difficult to access location, such as under low bridges, with the superstructure more conveniently erected after placement of the building 10. Further, the floating building 10 can be easily moved to various different locations, at any stage during the superstructure construction process, as illustrated in FIGS. 5 and 6.

A wide range of structures may be erected to form the superstructure of the water-buoyant structure 10. As suggested above, these structures can convert the building into a wharf, pontoon, floating accommodation, entertainment facility, warehouse, etc.

During construction of the superstructure 30, the water ballast of the building can be adjusted (as outlined above) in order to maintain a desired freeboard of the building, as the weight of added superstructure elements is increased. During, and after construction, the building 10 can be connected to nearby land or other structures or vessels via services or underwater umbilical arrangements. The complete combined structure can then be floated to further locations as needed (for example by towing with tugs), and then re-anchored/resecured in place.

Once placed in a desired location, the building 10 is secured to the sea bed via fixings in the form of cables, piles or other anchoring arrangements. In particular, a spring or elastic matrix mooring system, for example a system supplied by SEAFLEX® can be used. Such elastic restraint systems are responsive to tidal variation, allowing for limited translational movement of the building, whilst restricting pitch, yaw, roll and vibration.

As set forth above, the massive weight of the floating structure imparts a considerable inertial damping effect, which dampens the effects of wave action present in the body of water and mitigates unwanted movement of the structure.

Variations and modifications may be made to the structure as previously described without departing from the spirit or ambit of the disclosure.

In the claims which follow and in the preceding summary except where the context requires otherwise due to express language or necessary implication, the word "comprising" is used in the sense of "including", that is, the features as above may be associated with further features in various embodiments.

The invention claimed is:

1. A water-buoyant structure formed from concrete, the structure comprising an outer wall that surrounds a perimeter of the structure and an inner wall that surrounds the perimeter of the structure and is separated from the outer wall by a cavity, such that the cavity extends for the entire perimeter of the structure, the structure further comprising a base, wherein the outer wall extends to define an outer base wall of the base and the inner wall extends to define an inner base wall of the base separated from the outer base wall by the cavity, such that the cavity also extends for the entire base of the structure,
  wherein a plurality of longitudinal webs extend along and between the outer base wall and the inner base wall, to connect the outer base wall and the inner base wall and thereby divide the cavity that extends for the entire base of the structure into a plurality of elongate compartments, one or more of the plurality of compartments configured to be fluid-tight and able to be flooded with water and, optionally, emptied of that water, the elongate compartments further configured to allow controlled fluid communication between adjacent compartments.

2. A water-buoyant structure as claimed in claim 1, further comprising a plurality of transverse webs that extend between the inner wall and outer wall, the webs configured to divide the cavity into a plurality of sub-cavities.

3. A water-buoyant structure as claimed in 2, wherein one or more of the plurality of sub-cavities is configured to be made water/fluid-tight.

4. A water-buoyant structure as claimed in claim 2, wherein one or more of the sub-cavities is able to be flooded with water and, optionally, emptied of that water such as by pumping.

5. A water-buoyant structure as claimed in claim 2, wherein one or more of the webs comprises a baffle, such that each sub-cavity is separated from each adjacent sub-cavity by a common baffle.

6. A water-buoyant structure as claimed in claim 5, wherein at least some of the baffles are configured to allow fluid to pass between adjacent sub-cavities.

7. A water-buoyant structure as claimed in claim 1, wherein each of the inner and outer walls is formed from concrete, optionally reinforced concrete.

8. A water-buoyant structure as claimed in claim 1, further comprising a basement structure, at least a portion of which locates below the waterline in use.

9. A water-buoyant structure as claimed in claim 8 further comprising a superstructure that sits above the basement structure, to locate above the waterline in use.

10. A water-buoyant structure as claimed in claim 1, wherein the volume of the cavity or sub-cavities equates to less than half of a total volume of a basement of the structure.

11. A water-buoyant structure as claimed in claim 1, wherein, in use, a freeboard of the structure is substantially less than a draft of the structure.

* * * * *